United States Patent [19]

Oishi et al.

[11] Patent Number: 4,518,134
[45] Date of Patent: May 21, 1985

[54] MAGNETIC TAPE CASSETTE

[75] Inventors: Kengo Oishi; Osamu Suzuki, both of Kanagawa, Japan

[73] Assignee: Fuji Photo Film Co., Ltd., Tokyo, Japan

[21] Appl. No.: 602,640

[22] Filed: Apr. 20, 1984

[30] Foreign Application Priority Data

Apr. 21, 1983 [JP] Japan ............................. 58-58683[U]

[51] Int. Cl.³ .......................... G03B 1/04; G11B 15/32
[52] U.S. Cl. ..................................... 242/199; 242/76; 226/194
[58] Field of Search .......... 242/76, 192, 194, 197–200; 226/189, 190, 194; 360/93, 96.1, 132; 352/72–78 R

[56] References Cited

U.S. PATENT DOCUMENTS 2,930,080  3/1960  Haw ................................. 226/189
3,829,040  8/1974  Nelson .............................. 242/199
3,848,265  11/1974 Biery et al. ........................ 242/189
4,403,720  9/1983  Grant ................................ 226/194

Primary Examiner—Leonard D. Christian
Attorney, Agent, or Firm—Sughrue, Mion, Zinn, Macpeak & Seas

[57] ABSTRACT

A Phillips-type magnetic tape cassette in which widthwise motion of the tape is restricted. The cassette has rotary guide rollers arranged at both ends of the front part of the cassette for guiding the running of the magnetic tape. A shaft supporting each rotary guide roller is cylindrical and has a slit extending in the axial direction and a circumferential annular groove formed in the outer wall in a middle region. Each rotary guide roller has circumferential engaging protrusions extending from the inner wall thereof, which are inserted into the annular groove so that the rotary guide roller is pivotally mounted on the supporting shaft.

5 Claims, 5 Drawing Figures

MAGNETIC TAPE CASSETTE

BACKGROUND OF THE INVENTION

The present invention relates to magnetic tape cassettes. More particularly, the invention relates to a so-called Phillips-type magnetic tape cassette in which a magnetic tape wound on a pair of winding cores is loaded between the upper and lower halves of the cassette.

Heretofore, in a magnetic tape cassette of this type, the space defined by the upper and lower halves is divided in an area ratio of the order of 5:1 into a winding core accommodating region for accommodating the winding cores and a recording and reproducing region by partition members which form a single partition along the front opening of the cassette.

In addition, rotary guide rollers which contact the base side of the tape to guide the running of the tape are arranged at both ends of the recording and reproducing region, which occupies the front part of the cassette. When the tape is run while contacting the outer walls of the rotary guide rollers with a predetermined angle, the rotary guide rollers are turned in the tape running direction so as to smoothly change the tape running direction in the recording and reproducing region and the winding core accommodating region. Accordingly, the tape running characteristic in the recording and reproducing region is greatly affected by the characteristics of rotation of the rotary guide roller.

The fundamental structure of the above-described conventional guide roller will be described with reference to FIG. 1. FIG. 1 is a cross-sectional view of the cassette showing the rotary guide roller.

As shown in FIG. 1, each rotary guide roller 2 is mounted on a supporting shaft 8 which extends from a mounting seat 7 in the lower half 6 of the cassette. The rotary guide rollers 2 are rotatably arranged on both sides of a recording and reproducing region A which occupies the front part of the cassette 1. The upper half 9 has a mounting seat 10 having a recess 11 which receives the supporting shaft 8. Because the end portion of the shaft 8 is inserted into the recess 11, the vertical movement of the guide roller 2 is limited by the mounting seats 7 and 10.

A magnetic tape T is laid over the rotary guide rollers 2 in such a manner that its base side is in contact with the cylindrical outer wall 3 of each roller 2 with an angle formed by the tape running direction in the recording and reproducing region A and the winding core accommodating region B. As the tape T runs, the guide roller 2 is rotated in the tape running direction to guide the tape T.

The guide roller 2 has flanges 4 at both ends to prevent the vertical displacement of the tape T from the cylindrical outer wall 3. However, since there are small gaps between the mounting seats 7 and 10 and the two end faces of the guide roller 2, respectively, the guide roller 2 is allowed to move up and down in the direction of the axis of the supporting shaft 8. That is, although the guide roller 2 has the flanges 4, the tape still can move somewhat in its widthwise direction. For the same reason, when shock or vibration is imparted to the cassette 1 from the outside, the guide roller 2 is caused to move up and down, thus causing the tape T to be displaced in its widthwise direction.

In general, the upper and lower halves 6 and 9 of the cassette are made of a plastic resin. Therefore, it is difficult to dsign the upper and lower halves so that, when they are combined together, the aforementioned gaps are very small. On the other hand, in order to provide smooth rotation of the guide roller, there must be suitable gaps between the mounting seats and the two end faces of the guide roller.

Heretofore, in recording or reproducing signals with the cassette 1, the number of tracks has typically been four. Accordingly, the displacement of the tape T in its widthwise direction, being small compared with the track width, causes no tracking error.

There has been a strong demand for the provision of a cassette suitable for recording and reproducing signals with a high density for multi-track recording. For instance, in a pulse code modulation (PCM) type signal recording and reproducing system for a digital audio system, multiple tracks, for instance thirty-two tracks, are used for recording and reproducing signals with the conventional Phillips-type cassette. In this case, the width of each track is of the order of 100 microns, which is considerably smaller than the conventional track width. Accordingly, even a slight shift of the tape T in its widthwise direction causes a tracking error.

SUMMARY OF THE INVENTION

In view of the foregoing, an object of the invention is to provide a magnetic tape cassette in which the displacement of the rotary guide rollers 2 in the widthwise direction of the tape is prevented in order to eliminate the occurrence of tracking errors.

The foregoing objects and other objects of the invention have been achieved by the provision of a magnetic tape cassette having rotary guide rollers arranged at both ends of the front part of the cassette for guiding the running of a magnetic tape, in which, according to the invention, a shaft supporting each rotary guide roller is cylindrical and has a slit cut in the axial direction thereof and an annular groove cut in the cylindrical outer wall along the middle of the circumference thereof. Each rotary guide roller has engaging protrusions which protrude from the cylindrical inner wall and extend circumferentially therearound. The supporting shaft is inserted into the rotary guide roller to fit the engaging protrusions into the annular groove so that the rotary guide roller is pivotally mounted on the supporting shaft.

DESCRIPTION OF THE PREFERRED EMBODIMENTS

An example of a cassette constructed according to the invention will be described with reference to the accompanying drawings.

Figure 1:
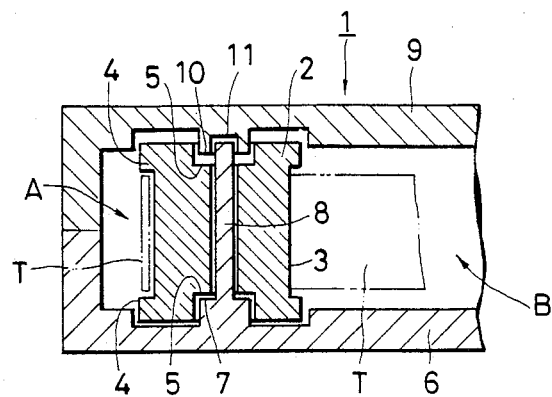
FIG. 1 is a cross-sectional view of a part of a conventional cassette showing a rotary guide roller.
Figure 2:
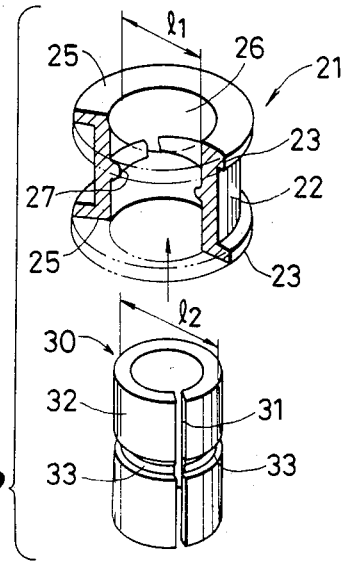
FIG. 2 is an exploded perspective view showing a rotary guide roller and its supporting shaft in an example of a cassette according to the invention.

FIG. 2 is an exploded perspective view showing a rotary guide roller according to the invention and a supporting shaft for the guide roller.

As shown in FIG. 2, the rotary guide roller 21 is cylindrical and has engaging protrusions 27 extending circumferentially along the middle of the inner surface of the guide roller 21, protruding from the cylindrical inner wall 26 radially of the guide roller 21. As in the conventional guide roller, the guide roller 21 has upper and lower flanges 23 and 23 at both ends, and a cylindrical outer wall 22 between the flanges 23. The tape is laid on the outer wall 22. The width of the outer wall 22 is slightly larger than that of the tape T (FIG. 4). The engaging protrusion 27 is semicircular in section as shown in FIG. 3.

The supporting shaft 30 holding the rotary guide roller 21 is cylindrical and it has a slit 31 formed in the outer wall 32 along the middle thereof. The guide roller 21 is supported by the supporting shaft 30 with the engaging protrusions 27 inserted into the annular groove.

The configuration in section of the groove 33 is such that the side walls 34 are inclined with respect to the bottom 35 in such a manner that the groove width is gradually decreased. The inside diameter $l_1$ of the rotary guide roller 21 is substantially equal to the outside diameter $l_2$ of the supporting shaft 30. Due to the provision of the slit 31, the supporting shaft 30 has elasticity in its radial direction so that the supporting shaft 30 can be readily inserted into the guide roller 21.

Figure 3:
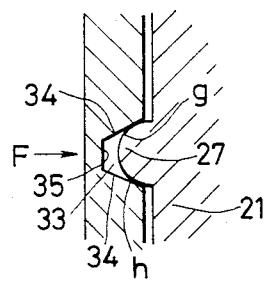
FIG. 3 is an enlarged sectional view showing the engagement of the rotary guide roller with the supporting shaft in the cassette according to the invention.
Figure 4:
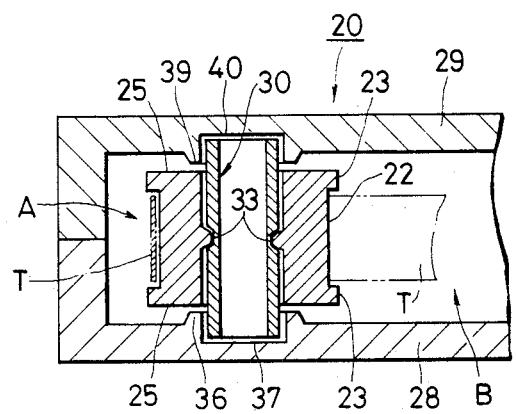
FIG. 4 is a cross-sectional view showing a part of the cassette of the invention showing the rotary guide roller with the supporting shaft.

FIG. 3 is a sectional view showing the engagement of the groove 33 with the engaging protrusion 27.

The engaging protrusion 27 is engaged with the annular groove 33 in such a manner that, as shown in FIG. 3, the protrusion 27 is in contact with the upper and lower side walls 37 (as indicated at g and h), whereby the rotary guide roller 21 is positively held by the supporting shaft. The rotary guide roller 21 is held with the engaging protrusion 27 in line contact with the upper and lower side walls 34 of the annular groove as described above. As a result, the vertical movement of the guide roller 21 is limited, and the frictional resistance is reduced when the guide roller is turned. That is, the guide roller can be rotated smoothly.

The engaging protrusion 27 is suitably brought into contact with the annular groove 33 by utilizing an elastic force F (produced due to the slit 31) which acts radially outwardly of the supporting shaft 30. In other words, the elastic force F is utilized for engaging the protrusion 27 with the groove 33 so that the guide roller 21 can turn smoothly. Accordingly, the vertical movement of the guide roller 21 is more positively prevented.

As in the conventional guide roller, the material of the guide roller 21 may be a plastic resin such as polyacetal resin. The supporting shaft 30 may also be made of plastic resin. However, if it is made of metal, then its wear resistance and dimensional accuracy are improved so that the rotary guide roller 21 will rotate more smoothly.

FIG. 4 is a cross-sectional view of the cassette 20 including the rotary guide roller 21 and the supporting shaft 30.

As shown in FIG. 4, the supporting shafts 30 holding the respective guide rollers 21 are held between the upper and lower halves 28 and 29 and arranged at both ends of the front region of the cassette, namely, the recording and reproducing region A with the upper and lower ends of each supporting shaft 30 inserted into the recesses 37 and 40 of the mounting seats 36 and 39.

Similar to the conventional cassette, the tape T is laid over the outer walls 22 of the guide rollers 21 with a predetermined angle. When the tape T is run in the recording and reproducing region A and the winding core accommodating region B, the guide rollers 21 are turned in the tape running direction to guide the tape T. In this rotation, the upper and lower end faces 25 of the guide rollers 21 are maintained apart from the mounting seats 36 and 39.

As is apparent from the above description, according to the invention, the engaging protrusions 27 are engaged with the annular groove 33 in such a manner that they are in contact with the two side walls of the groove (as indicated at g and h), so that the guide roller 21 is turned without moving up and down. Accordingly, the displacement of the tape T in its widthwise direction due to the vertical movement of the rotary guide rollers 21 is eliminated. The occurrence of tracking error during recording and reproducing is thus prevented.

The rotary guide roller 21 is held and turned with its end faces 25 maintained apart from the mounting seats 36 and 39. Therefore, even if the mounting seats are roughly finished, the characteristics of rotation of the rotary guide roller are not affected by the accuracy of finish, and the tape T is run satisfactorily.

In the above-described example of a magnetic tape cassette of the invention, the engaging annular protrusions 27 are semicircular in cross-section and the annular groove 33 is tapered toward the bottom 35 so that the protrusions 27 are engaged with the groove 33. However, it should be noted that the invention is not limited to this construction. For instance, the engaging protrusions and the annular groove may be modified as shown in FIG. 5.

Figure 5:
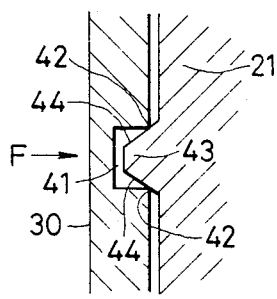
FIG. 5 is an enlarged sectional view showing a modification of the engagement of a engaging protrusion with an annular groove.

In FIG. 5, a groove 41 cut in the supporting shaft 30 is rectangular in cross-section, and each engaging protrusion 43 formed on the inner wall of the rotary guide roller 21 has upper and lower tapered surfaces 44. In this modification, the tapered surfaces 44 of the engaging protrusion 43 are brought into contact with the edges 42 of the groove 41 so that the rotary guide roller 21 is rotatably held by the supporting shaft 30 without moving up and down.

In the above-described cassette of the invention, a plurality of engaging protrusions 27 or 43 are formed along the inner wall of the rotary guide roller 21. However, they may be replaced by one engaging annular protrusion if desired.

We claim:

1. In a magnetic tape cassette having rotary guide rollers arranged at both ends of the front part of said cassette for guiding the running of a magnetic tape, the improvement comprising:

a cylindrically shaped shaft supporting each rotary guide roller, said shaft having a slit formed in the axial direction thereof, an outer wall, and a circumferential annular groove formed in said outer wall in a middle region thereof;

each said rotary guide roller having an inner wall and circumferential engaging protrusions, protruding from said inner wall in a middle region thereof;

said supporting shaft being inserted into said rotary guide roller to fit said engaging protrusions into said annular groove so that said rotary guide roller is pivotally mounted on said supporting shaft.

2. The magnetic tape cassette of claim 1, wherein said circumferential annular groove is rectangular in cross section.

3. The magnetic tape cassette of claim 1, wherein said circumferential annular groove is trapezoidal in cross section, having a base oriented towards said protrusions.

4. The magnetic tape cassette of claim 1, wherein said circumferential engaging protrusions are semicircular in cross section.

5. The magnetic tape cassette of claim 1, wherein said circumferential engaging protrusions are trapezoidal in cross section, having an apex disposed in said circumferential annular groove.

* * * * *